United States Patent [19]

Meyer

[11] Patent Number: 5,519,755
[45] Date of Patent: May 21, 1996

[54] CIRCUIT FOR A LINE SIMULATING DEVICE

[75] Inventor: Stephan Meyer, Berlin, Germany

[73] Assignee: Siemens Aktiengesellschaft, München, Germany

[21] Appl. No.: 175,370

[22] PCT Filed: May 12, 1992

[86] PCT No.: PCT/DE92/00392

§ 371 Date: Feb. 4, 1994

§ 102(e) Date: Feb. 4, 1994

[87] PCT Pub. No.: WO93/01661

PCT Pub. Date: Jan. 21, 1993

[30] Foreign Application Priority Data

Jul. 5, 1991 [DE] Germany .......................... 41 22 730.1

[51] Int. Cl.⁶ .............................. H04M 3/08; H04M 1/24; H04M 9/00; H04M 1/76
[52] U.S. Cl. .............................. 379/10; 379/21; 379/394; 379/398; 379/414
[58] Field of Search ................. 379/10, 21, 394, 379/398, 414, 415, 416, 417

[56] References Cited

U.S. PATENT DOCUMENTS

| | | |
|---|---|---|
| 1,533,178 | 4/1925 | Gilbert . |
| 3,745,261 | 7/1973 | Friedman ................. 379/394 |
| 3,823,281 | 8/1974 | Chambers ................ 379/398 |
| 3,932,712 | 1/1976 | Suntop .................... 379/414 |
| 3,956,601 | 5/1976 | Harris ...................... 379/21 |
| 4,852,160 | 7/1989 | Kiko ........................ 379/398 |
| 4,866,767 | 9/1989 | Tanimoto ................. 379/398 |
| 5,173,896 | 12/1992 | Dariano ................... 379/21 |

*Primary Examiner*—Stephen Chin
*Assistant Examiner*—Vijay Shankar
*Attorney, Agent, or Firm*—Kenyon & Kenyon

[57] ABSTRACT

A circuit for simulating the transmission characteristics of lines carrying digital signals, such as bus lines in ISDN networks. A partial line simulating device is assembled as a standard circuit including three different circuit parts in such a manner that any line design of any line length can be simulated.

3 Claims, 1 Drawing Sheet

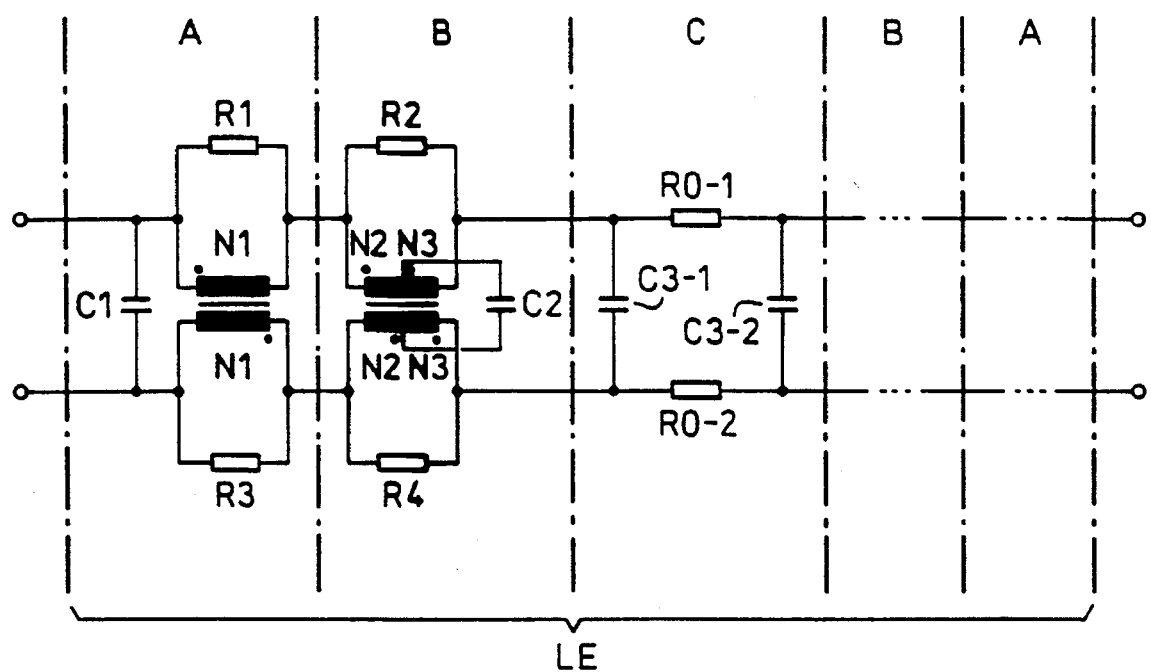

CIRCUIT FOR A LINE SIMULATING DEVICE

BACKGROUND OF THE INVENTION

The present invention relates to a circuit for a line simulating device for simulating the transmission characteristics of lines carrying digital signals, such as bus lines operable in ISDN networks.

The transmission parameters of a line often must be simulated to investigate the transmission characteristics of bus lines in a system mentioned at the outset, composed of a network termination, the line, and the peripherals attached thereto. A natural simulation of the transmission characteristics of buses operated in the system, over which digital signals are transmitted, for example, is possible with the line simulation afforded by the circuit of the present invention.

The known CCITT guideline for line simulation is incomplete regarding the various designs of the lines used. This is unacceptable since various lines have very different transmission characteristics, especially at frequencies above 100 kHz, and display equivalence corresponding to the CCITT guideline only at a frequency of 96 kHz.

Therefore, there exists a need for a circuit for stimulating different line designs in a simple manner.

SUMMARY OF THE INVENTION

The present invention provides a circuit which meets the above-mentioned need. In the circuit of the present invention:

a) the line simulating device includes a number of partial line simulating devices, each stimulating a specific partial line length and the maximum line length of the line to be stimulated being expressed in multiples of the partial line length;

b) the partial line simulating devices are constructed in modular form and each is equipped with a transformer-coupled circuit part A, short-circuited at the input by a first capacitor unit, a transformer-coupled circuit part B with its windings being center tapped and short-circuited by a second capacitor unit, and a circuit part C on the line plane with the DC resistance on the input and output sides, each being short-circuited by a third capacitor unit, which is connected on the output side in mirror-image sequence with another circuit part B and a following additional circuit part A;

c) each of the transformer-coupled circuit parts A has a series resistance (R1) and (R3) wired in parallel with a first inductance composed of winding N1;

d) the transformer-coupled circuit parts B each have one additional series resistance (R2) and (R4) wired in parallel with the inductance composed of windings N2+N3;

e) the series resistances wired in parallel are equivalent;

f) the additional series resistances wired in parallel are equivalent;

g) the first capacitor unit and the third capacitor unit are equivalent; and h) the second capacitor unit has twice the capacitance of the first capacitor unit.

With the structured circuit according to the present invention, all the values for the resistances, inductances, and capacitances for a certain line design can be determined from information provided by the manufacturer of the lines (i.e., resistance per unit length R* (Ohm/kin), inductance per unit length L* (H/km), and capacitance per unit length C* (F/km)), with the known means of evolution strategy. Details of evolution strategy are available in the book "Evolution Strategy" by Ingo Rechenberg, Fromann-Holzboog, Stuttgart-Canstatt, 1973, and "VDI Progress Reports 1982," by Martin Ruppert. While the various line designs produce correspondingly different combinations of the values for resistances R0, R1, to R4, for inductances L1, L2, and for capacitances C1 to C3, the individual components are always arranged according to the present invention. Since the line simulations form the transmission characteristics of the different designs of the lines, measurements directly on cable drams can be eliminated. On the other hand, the so-called extension line known from DE-PS 500 371 permits only integral multiplications of a given damping value by a so-called root line. The root line is connected twice in series for example, to produce twice the damping value.

In the present invention, standardized partial line simulating devices are provided, each simulating device representing a specific line length. In such an arrangement, a corresponding multiplication of the line simulation can be implemented in simple fashion for a wide variety of different line lengths. In this connection, in addition to the multiplying the partial line simulating devices, their individual values may be designed with variable resistances, inductances, and capacitances by suitable circuit measures. As a result in practice, a universal line simulation for the most diverse line designs with the greatest differences in length is available.

BRIEF DESCRIPTION OF THE DRAWINGS

FIG. 1 is a schematic which illustrates the circuit of the present invention.

DETAILED DESCRIPTION

The circuit shown in FIG. 1 includes three different circuit parts A, B, and C. Circuit part C is connected on the output side in a mirror-image sequence with an additional circuit part B and an additional circuit part A connected thereto. Each circuit part A, B, C has first port, represented by nodes 1 and 3 and a second port, represented by nodes 2 and 4.

As already mentioned, individual values for the resistances, capacitances, and inductances of the circuit according to the present invention can be determined from manufacturer data on resistance per unit length R* (Ohm/km), inductance per unit length L* (H/km), and capacitance per unit length C* (F/km). The following relationship applies to capacitance per unit length C*:

$$C^*(F/km) \times (LE/2) \, (km) = Cg = C2 + C3$$

Since C1=C3:

$$C2 = Cg - (C1 + C3)$$

The following relationship applies to resistance per unit length R*:

Based on an equivalent circuit diagram with a DC resistance R0* in series with two partial inductances L1* and L2*, with which the AC resistances R1* and R2* are wired in parallel, $$z = R'_{(w)} + jwL'_{(w)}.$$

By means of the evolution strategy, the DC resistance RO*, the AC resistances RI* and R2*, and the inductances L1* and L2* can be determined, where $$(R1*)/(wL1*) \leq (R2*)/(wL2*)$$

For the DC resistance:

$$RO* = RO\text{-}1 + RO\text{-}2$$

For the AC resistances:

$$R1* = 2R1 + 2R3; \text{ and}$$

$$R2* = 2R2 + 2R4.$$

For the inductances:

$$L1* = Lg = 2(N_1 + N_1)^2 A1 = 2(4 \text{ i } N_1^2 A1); \text{ and}$$

$$L2* = Lg = 2(N_2 + N_2 + N_3 + N_3)^2 A1.$$

All individual values refer to a single partial line simulating device LE for a very specific line length.

I claim:

1. A circuit for simulating transmission characteristics of lines which have a maximum length and which carry digital signals, the circuit comprising:
    a) at least one partial line simulating unit, each partial line simulating unit simulating a specific partial line length such that the maximum length of a line to be simulated can be expressed in an integral multiple of partial line simulating units, and each partial line simulating unit including:
       i) a first inductive sub-circuit, said first inductive sub-circuit having
          a first port,
          a first capacitor connected across said first port,
          an inductor having a first winding and a second winding, and
          a first series resistance coupled in parallel with said first winding and a second series resistance coupled in parallel with said second winding, said first and second series resistances being equivalent;
       ii) a second transformer-coupled sub-circuit, said second transformer-coupled sub-circuit
          having a transformer having a first winding and a second winding, and
          having center taps at said first and second windings of said transformer of said second transformer-coupled sub-circuit,
          having a second capacitor connected across said center taps, said second capacitor having twice the capacitance as said first capacitor,
          having a first DC resistance wired in parallel with said first winding of said transformer of said second transformer-coupled sub-circuit and a second DC resistance wired in parallel with said second winding of said transformer of said second transformer-coupled sub-circuit, said first and second DC resistances being equivalent;
       iii) a third sub-circuit, said third sub-circuit
          having first and second ports, and
          having a third capacitor connected across said first port of said third sub-circuit and a fourth capacitor connected across said second port of said third sub-circuit, wherein said first capacitor, said third capacitor and said fourth capacitor are equivalent;
       iv) a fourth sub-circuit, said fourth sub-circuit being similar to said second transformer-coupled sub-circuit and having a first port and a second port, the second port coupled with said output second port of said third sub-circuit; and
       v) a fifth sub-circuit, said fifth sub-circuit being similar to said first inductive sub-circuit and having a second port coupled with said first port of said fourth sub-circuit.

2. The circuit of claim 1 wherein said inductor of said first inductive sub-circuit is a transformer.

3. The circuit of claim 1 wherein said inductor of said first inductive sub-circuit is a coil.

* * * * *